United States Patent [19]

Larson

[11] 4,356,343
[45] Oct. 26, 1982

[54] CLOSURE AND SEAL FOR SHEATHED MULTI-STRAND CABLE ENDS

[76] Inventor: Robert L. Larson, 2873 Velasco La., Costa Mesa, Calif. 92626

[21] Appl. No.: 149,049

[22] Filed: May 12, 1980

[51] Int. Cl.³ .............................................. H02G 15/04
[52] U.S. Cl. .................................. 174/74 A; 174/135; 428/40
[58] Field of Search .............. 174/10, 74 A, 76, 77 R, 174/135, 138 F; 138/96 R, 96 T; 428/35, 36, 40, 41, 42

[56] References Cited

U.S. PATENT DOCUMENTS

| | | | |
|---|---|---|---|
| 2,145,705 | 1/1939 | Wodtke | 174/74 A |
| 3,519,728 | 7/1970 | Gillemot | 174/76 |
| 3,555,171 | 1/1971 | Larson | 174/138 F |
| 3,590,139 | 6/1971 | Gillemot et al. | 174/76 |
| 3,742,123 | 6/1973 | Haub, Jr. | 174/138 F |

FOREIGN PATENT DOCUMENTS 1790059 11/1971 Fed. Rep. of Germany ... 174/74 A

Primary Examiner—Laramie E. Askin
Attorney, Agent, or Firm—William H. Maxwell

[57] ABSTRACT

A seal assembly for the hermetic closure of the cut ends of sheathed electrical cables, in unit readiness comprised of a cylinder form approximating the outer diameter of the sheathed cable, a sealant body adhered to an end wall of said form, and a conformable and/or elastic tape with a pressure sensitive adhesive side covered with a removable protective sheet having opposite release faces and wrapped over the cylinder form and sealant body in package configuration. Hermetically sealing a cut cable end is accomplished by removal of the stretch tape and reapplication thereof around the cylinder form and cable sheathing subsequent to forcefully applying the sealant body to said cut cable end with the end wall of the cylinder form.

21 Claims, 7 Drawing Figures

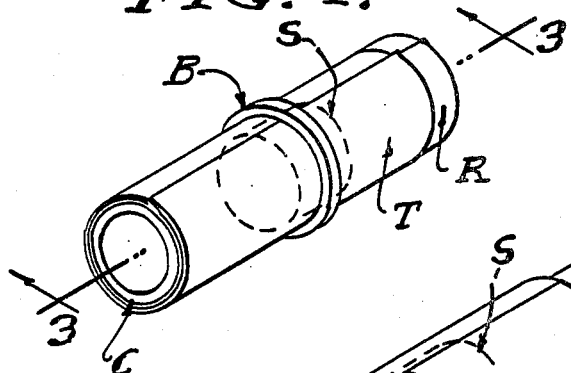
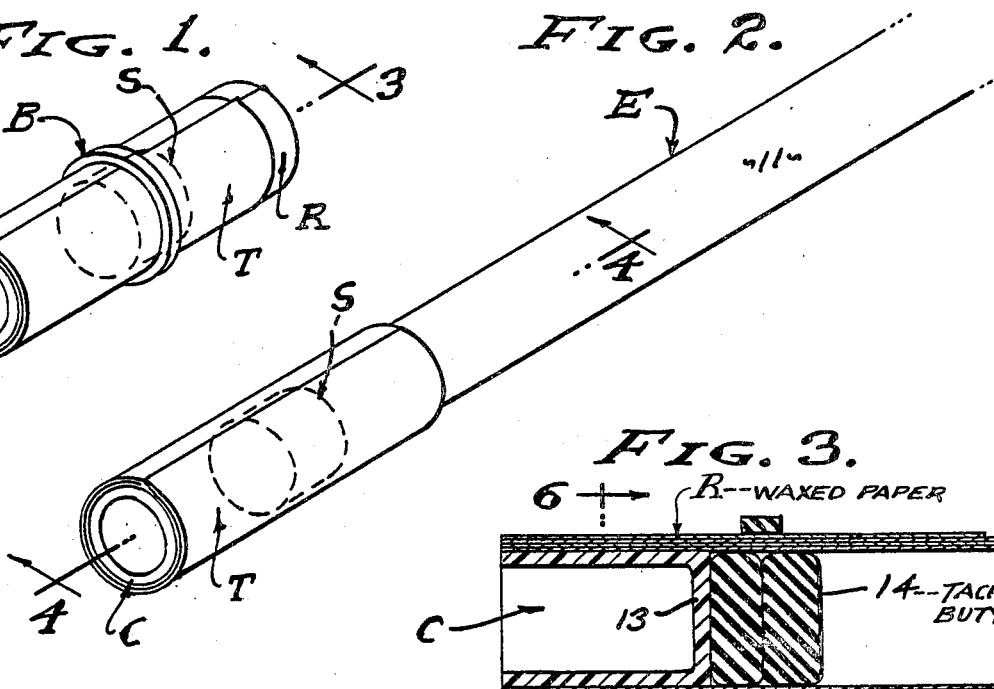
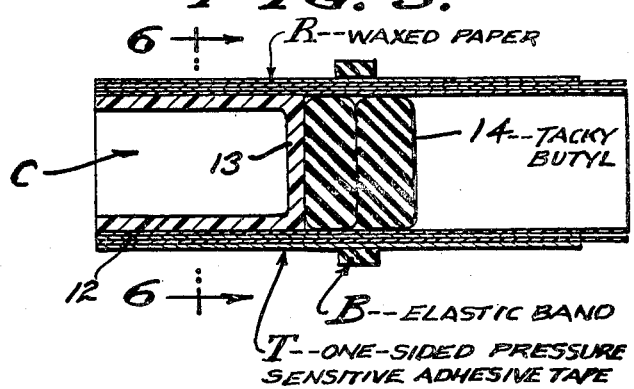
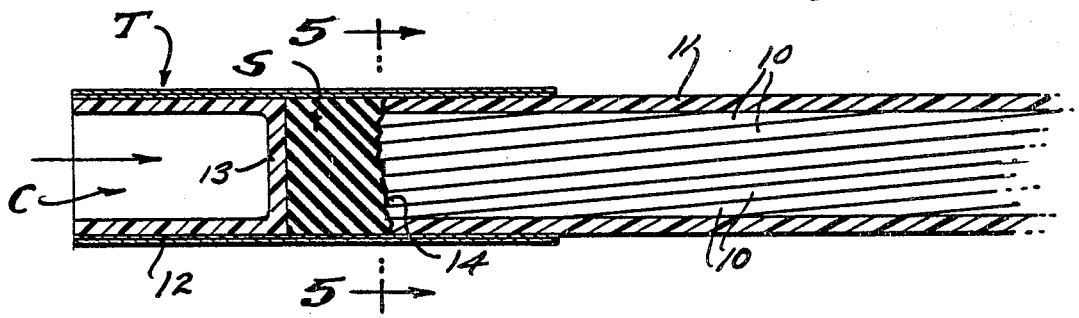
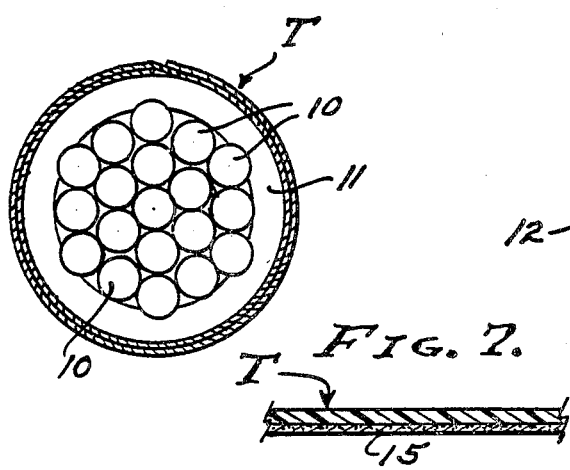
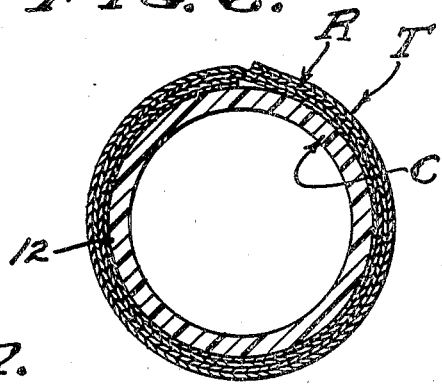

CLOSURE AND SEAL FOR SHEATHED MULTI-STRAND CABLE ENDS

BACKGROUND

Heavy electrical cables, and especially cables rated at 600 volts or more, are characterized by spirally wrapped multi conductors encased in a dielectric sheathing. The conductors are round wires of suitably conductive material such as copper or aluminum and alloys thereof, and spaces occur therebetween coextensively of the cable so that the surrounding environment can penetrate throughout the length of the cable via the cut off end thereof. Continued exposure to air, the humidity therein, and to water which can penetrate deeply throughout the length of open cut ends of cables results in a deterioration of the conductors, as they will corrode. Corrosive action is especially detrimental to aluminum cables, which are widely used, since aluminum quickly reverts to its oxide form where moisture is present and even more quickly when subject to the potential of and the flow of electric current. Therefore, both preparatory to and after installation, such cables should be protected against the encroachment of moisture-laden fluids into the interstices between the multiple conductors. Accordingly, it is an object of this invention to provide a seal assembly whereby electrical cable ends can be hermetically closed.

Heretofore, the cut ends of electrical cables have been closed by caps, and when caps are not available, they have been wrapped with tape. In order for a cap to be effective it must fit the cable exactly, otherwise additional means must be resorted to in sealing the cable end. In practice, tapes are wrapped over cut cable ends, over the caps and over the bare cable ends when caps are not available. And, in the process of wrapping on the tape so as to be apparently effective, wrinkles develope in the tape which often open into the cable ends and admit the surrounding atmosphere. Consequently, such tape wrappings are dependent entirely upon the ingenuity of the worker applying the same, and many times the wrappings are deficient. Therefore, it is an object of this invention to prepare a hermetic sealant in package form for application to cut cable ends, and thereby eliminate profuse and unnecessary wrappings. With the present invention Butyl rubber is employed as the sealant.

Butyl rubber in its sealant form as it is used herein is by its very nature uncured and remains tacky, and in order to be effective to seal with a cable end, the sealant body must also retain a configuration substantially coextensive with the said cable end. It is therefore another object of this invention to provide a form carrier by which the tacky sealant can be stored, transported and forcefully applied over the cable end in a configuration complementary thereto. With the present invention, this form carrier is a cylinder of the diameter or approximately of the diameter of the sheathed cable, and it features an end wall to which the sealant body adheres in order to be carried thereby and also by which it can be forcefully applied to the cut cable end through manipulation of the cylinder-shaped carrier.

The tacky sealant body requires protection in both its package and installed configurations. Accordingly, a short length of tape capable of several turns around the form carrier and cable sheath is supplied with the package. It is an object of this invention to advantageously employ the one and the same tape for both the package form and installation condition of the seal assembly, a one-sided pressure sensitive adhesive tape in which the adhesive side is used but once in the installed condition. With the present invention a double-faced protective sheet having opposite release faces is employed so that its application coextensively of the one pressure sensitive adhesive side of the tape permits its unrestrained wrapping and removal from around both the form carrier and attached sealant body. However, upon removal of the protective sheet, the pressure sensitive adhesive is exposed so as to be secured around all three of the involved structural elements; the form carrier, the sealant body, and the cable sheath. In practice, the package assembly is held intact by means of a constrictive elastic band; the band and protective sheet being expendable.

The foregoing and other various objects and features of this invention will be apparent and fully understood from the following detailed description of the typical preferred form and application thereof, throughout which description reference is made to the accompanying drawings.

DESCRIPTION OF THE DRAWINGS

FIG. 1 is a perspective view of the seal assembly unit as it is provided by the present invention.

FIG. 2 is a perspective view of the seal assembly applied to a cable end.

FIGS. 3 and 4 are enlarged longitudinal sectional views taken as indicated by lines 3—3 and 4—4 on FIGS. 1 and 2 respectively.

FIG. 5 is an enlarged detailed cross sectional view taken as indicated by line 5—5 on FIG. 4, FIG. 6 is an enlarged detailed cross sectional view taken as indicated by line 6—6 on FIG. 3, and, FIG. 7 is an enlarged fragmentary sectional view of the one-sided adhesive tape as it is used herein.

PREFERRED EMBODIMENT

In the drawings I have shown a typical elongated cable member of the general type under consideration. As shown, the elongated electrical cable E is comprised of multi-strand conductors 10 encased in a dielectric sheath 11, the sheath 11 being the tubular exterior element that characterizes all cables to which the seal assembly is to be hermetically attached. In practice, the degree of adherency can vary and adhesion and tackiness controlled accordingly, it being preferred that the seal assembly be manually applicable for attachment to the cable E, and likewise manually detachable therefrom, all without disturbance to the physical structure and properties of the said exterior sheath 11 and inner conductors 10. As is indicated, the conductors 10 are made of round wire, for example of copper or aluminum, and the sheath 11 is made up of a plastic dielectric, for example of polyethylene or polyvinylchloride.

The electric cable is heavy and stiff, with a sheath 11 of substantial thickness. The cable is cut in various ways, and in all instances the cut end is roughly in a transverse plane exposing the cut ends of a multiplicity of conductors 10 with interstices therebetween. It is the surrounding sheath 11 and each individual conductor 10 to which a sealant body S is to be applied with pressure that extrudes the sealant somewhat into the said interstices. The degree of conformity to the rough cut end is ensured by firmly applying a moderate amount of manual force axially in opposition to the cut end of the cable end to be sealed.

The package unit is best illustrated in FIG. 1 of the drawings where the exposed and protective elements are indicated as the form carrier C and the pressure sensitive adhesive tape T with the protective release sheet R laminated therewith, and all held secure over the sealant body obscured thereby by means of a constrictive elastic band B.

The form carrier C is a cup-shaped part elongated to an extent so as to present a manipulatable cylinder approximating the outer sheath diameter of the cable E to be sealed. The outer cylinder wall 12 thereof is of right cylinder form, and one end of the form carrier C is closed by an end wall 13 normal to its axis. The cross sectional diameter of the form carrier C can vary as circumstances require to correspond approximately with that of the cable E exterior, the sheath thereof. In practice, the form carrier C is molded with walls of a substantial thickness and of any suitable plastic material such as of polystyrene or the like.

In accordance with this invention, I have provided the multi-purpose sealant body S that attaches itself to the end wall 13 of the form carrier C and which subsequently attaches to the rough cut ends of the sheath and conductors, and which hermetically seals the terminal end portions of said sheath and connectors. The sealant body S can vary for different applications and is selected for its ability to adhere to the particular material of the sheath 11 and of the conductors 10. For example, with the sheath 11 and metalic conductors 10 hereinabove specified, the adhesive sealant body S is preferably of uncured Butyl rubber which is inherently tacky and a contact adhesive material that is fluid under normal environmental conditions at moderate working temperature.

In carrying out this invention the Butyl rubber is formed into a right cylinder body or plug having opposite normal ends, one end permanently attached by adhesion to the end wall 13 to coextensively overlie the same, and the other end 14 exposed. In practice, the axial extent of sealant body S is at least half its diameter and preferably ⅔ its diameter. Although the sealant body S is essentially a single solid of plastic material, it is shown in FIG. 3 as being laminated of two-disc-shaped layers subsequently compressed into one as shown in FIG. 4. Accordingly, a substantial length of tacky exterior diameter is exposed between the walls 13 and 14.

The adhesive tape T is a polyethylene or a polyvinyl film coated on one side with a pressure sensitive adhesive 15, commonly referred to as one-sided pressure sensitive vinyl tape. A tape with substantial elasticity is to be desired, and a short length capable of several turns to constrict around the form carrier and cable sheath is sufficient. In its package form the tape T is coextensively protected by the release sheet R, a sheet of paper the opposite faces of which are waxed or otherwise prepared so as to pull away from the adhesive of tape T and from the tacky body of sealant S with facility. Accordingly, the tape T is reserved for subsequent one-time adhesion to the sheath 11 of cable E, and simultaneously protected from the tackiness of the Butyl rubber sealant S which it protects while in storage. Therefore, in carrying out this invention the package assembly is completed by removably wrapping the aforesaid form carrier C and attached sealant body S with the several turns of the tape T and release sheet R laminate, and securing the wrap with a constrictive elastic band B as shown.

The installed condition of the hermetic seal is best illustrated in FIG. 4 of the drawings where the assembled form carrier and the pressure sensitive adhesive tape T with the protective release laminate sheet R removed, are installed over the cut end of a cable E. In accordance with this invention the sealant body S is pressed between the end wall 13 of the form carrier and the terminal ends of the sheath 11 and multiple conductors 10, and the adhesive tape T is wrapped around the pressed assembly of the form carrier C, sealant body S and sheath 11 of the cut cable end. The outer diameters of the form carrier C, sealant body S and sheath 11 are substantially the same, but not critical, as axial force in compression between end wall 13 and the cable end causes some radial expansion of the sealant body S. The Butyl rubber remains soft and tacky and conforms to the rough cut end configuration of the sheath 11 and multiple conductors 10. The adhesive tape T is of a width to overlie the form carrier C, sealant body S and a substantial length of the end portion of the sheath 11, and wrapping thereof (sheet R removed) depresses the plastic or fluid sealant body S readily inward while adhesion thereof prevents separation of the form carrier and cable sheath and thereby applies hydraulic pressure that ensures fluid tightness of the seal and its conformity to and entry into the interstices to be closed. Air is effectively purged from the joint as and when the assembly is made and complete conformity of the sealant body S to the rough cable end is established. The result is a reliable hermetic seal.

From the foregoing it will be seen that packaged units as they are illustrated in FIG. 1 of the drawings are fabricated to the nominal diameter of the various electrical cables to be sealed thereby, respectively. Exact diameter is non-critical, as the installed condition of the assembly inherently conforms it to irregularities within a reasonable range of size difference. Assembly with a cable end is accomplished by release of the elastic band B and removal of the adhesive tape T and release sheet R laminate so as to expose the form carrier C and attached sealant body S. The form carrier C presents its elongated cylinder form for manipulation and forceful application of the sealant body S to the rough cut end of the cable E, whereupon the release sheet R is removed from tape T and said tape adhesively applied around the seal assembly and over the cable end portion for establishing the hermetic seal hereinabove described. It is significant that the seal installation is entirely manual and requires no tools or any other implements for its completion.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A seal assembly unit for the hermetic closure of a cut off end of a sheathed electrical cable having multiple conductors with interstices therebetween, including;

a form carrier with an exterior diameter approximately the same as the exterior diameter of the cable sheath and having an end wall to oppose the cable end, a sealant body of fluid material having a tacky consistency also with an exterior diameter approximately the same as the exterior diameter of the cable sheath and having opposite end faces, one end face of the sealant body being adhesively attached to the end wall of the form carrier, and the other end face of the sealant body being exposed for opposed conforming engagement with the cut off end of the sheathed cable, and a one-sided pressure sensitive adhesive tape laminated with a removable protective sheet having opposite release faces and wrapped around the assembled from carrier and sealant body for subsequent release and removal therefrom, the protective sheet being removable from the adhesive tape which then can be rewrapped around and adhesively secured to the form carrier and sealant body and cable sheath, subsequent to forcefully applying the sealant body against said cut off cable end by manipulation of the form carrier and end wall thereof to which the sealant body is attached.

2. The seal assembly unit as set forth in claim 1, wherein the form carrier is an elongated right cylinder having said exterior diameter approximately the same as the exterior diameter of the cable sheath and having said end wall to oppose the cable end.

3. The seal assembly unit as set forth in claim 1, wherein the form carrier is an elongated cup-shaped right cylinder having said exterior diameter approximately the same as the exterior diameter of the cable sheath and having a bottom end wall constituting said end wall to oppose the cable end.

4. The seal assembly unit as set forth in claim 1, wherein the sealant body end faces are substantially spaced so as to be depressible when forcefully applied against said cut off cable end.

5. The seal assembly unit as set forth in claim 1, wherein the fluid material of the sealant body is uncured Butyl rubber in its tacky form.

6. The seal assembly unit as set forth in claim 1, wherein the fluid material of the sealant body is layers of uncured Butyl rubber in its tacky form.

7. The seal assembly unit as set forth in claim 1, wherein the one-sided pressure sensitive adhesive tape is of elastic material that constricts onto the form carrier, sealant body and cable sheath when wrapped tightly therearound.

8. The seal assembly unit as set forth in claim 1, wherein the one-sided pressure sensitive adhesive tape is of elastic polyethylene film that constricts onto the form carrier, sealant body and cable sheath when wrapped tightly therearound.

9. The seal assembly unit as set forth in claim 1, wherein the one-sided pressure sensitive adhesive tape is of elastic polyvinylchloride film that constricts onto the form carrier, sealant body and cable sheath when wrapped tightly therearound.

10. The seal assembly unit as set forth in claim 1, wherein the protective sheet is double-faced waxed paper.

11. The seal assembly unit as set forth in claim 1, wherein the adhesive tape and protective sheet laminate is secured in its wrapped condition by a constrictive elastic band.

12. The seal assembly unit as set forth in claim 1, wherein the form carrier is an elongated cup-chaped right cylinder having said exterior diameter approximately the same as the exterior diameter of the cable sheath and having a bottom end wall constituting said end wall to oppose the cable end, wherein the fluid material of the sealant body is uncured Butyl rubber in its tacky form with its end faces substantially spaced so as to be depressible when forcefully applied against said cut off cable end, and wherein the one-sided pressure sensitive adhesive tape is of elastic plastic film that constricts onto the form carrier, sealant body and cable sheath when wrapped tightly therearound, and wherein the protective sheet is double-faced waxed paper.

13. The seal assembly unit as set forth in claim 12, wherein the adhesive tape and protective sheet laminate is secured in its wrapped condition by a constrictive elastic band.

14. A sheathed electrical cable having multiple electrical conductors with interstices therebetween and having a cut off end, and a seal hermetically closing said cut off end, comprising, in combination;

a form carrier with an exterior diameter approximately the same as the exterior diameter of the cable sheath and having an end wall opposing the cable end, a sealant body of fluid material having a tacky consistency also with an exterior diameter approximately the same as the exterior diameter of the cable sheath and having opposite end faces, one end face of the sealant body being adhesively attached to the end wall of the form carrier, and the other end face of the sealant body being adhesively attached to and in conforming engagement with the cut off end of the sheathed cable with a portion of the sealant body extending into said interstices, and a one-sided pressure sensitive adhesive tape wrapped around and adhesively secured to the form carrier and sealant body and cable sheath.

15. The combination as set forth in claim 14, wherein the form carrier is an elongated right cylinder having said exterior diameter approximately the same as the exterior diameter of the cable sheath and having said end wall opposing the cable end.

16. The combination as set forth in claim 14, wherein the form carrier is an elongated cup-shaped right cylinder having said exterior diameter approximately the same as the exterior diameter of the cable sheath and having a bottom end wall constituting said end wall opposing the cable end.

17. The combination as set forth in claim 14, wherein the fluid material of the sealant body is uncured Butyl rubber in its tacky form.

18. The combination as set forth in claim 14, wherein the one-sided pressure sensitive adhesive tape is of elastic material constricted onto the form carrier, sealant body and cable sheath.

19. The combination as set forth in claim 14, wherein the one-sided pressure sensitive adhesive tape is of elastic polyethylene film constricted onto the form carrier, sealant body and cable sheath.

20. The combination as set forth in claim 14, wherein the one-sided pressure sensitive adhesive tape is of elastic polyvinylchloride film constricted onto the form carrier, sealant body and cable sheath.

21. The combination as set forth in claim 14, wherein the form carrier is an elongated cup-shaped right cylinder having said exterior diameter approximately the same as the exterior diameter of the cable sheath and having a bottom end wall constituting said end wall opposing the cable end, wherein the fluid material of the sealant body is uncured Butyl rubber in its tacky form, and wherein the one-sided pressure sensitive adhesive tape is of elastic plastic film constricted onto the form carrier, sealant body and cable sheath.

* * * * *